United States Patent
Mulvey

(10) Patent No.: US 12,540,672 B2
(45) Date of Patent: Feb. 3, 2026

(54) PISTON DEVICE WITH COMBINED VERTICAL AND LATERAL GAS PORT

(71) Applicant: Race Winning Brands, Inc., Mentor, OH (US)

(72) Inventor: Bryce Mulvey, Cypress, CA (US)

(*) Notice: Subject to any disclaimer, the term of this patent is extended or adjusted under 35 U.S.C. 154(b) by 0 days.

(21) Appl. No.: 18/969,801

(22) Filed: Dec. 5, 2024

(65) Prior Publication Data

US 2025/0189037 A1 Jun. 12, 2025

Related U.S. Application Data

(60) Provisional application No. 63/606,631, filed on Dec. 6, 2023.

(51) Int. Cl.
*F16J 1/09* (2006.01)
*F16J 1/00* (2006.01)

(52) U.S. Cl.
CPC ........ *F16J 1/09* (2013.01); *F16J 1/001* (2013.01)

(58) Field of Classification Search
CPC .................. F16J 1/09; F16J 1/001; F02F 5/00
See application file for complete search history.

(56) References Cited

U.S. PATENT DOCUMENTS

2016/0040780 A1* 2/2016 Donahue .............. F16J 9/064
123/193.4

FOREIGN PATENT DOCUMENTS

WO WO-2019074620 A1 * 4/2019 .............. F16J 1/09

* cited by examiner

*Primary Examiner* — Abiy Teka
(74) *Attorney, Agent, or Firm* — Brennan, Manna & Diamond, LLC

(57) ABSTRACT

A piston device with combined vertical and lateral gas port is provided. The device comprises an engine piston with integrated combined gas ports to optimize performance, sealing, and durability. Central to the invention is a singular gas port that merges lateral and vertical gas port functionalities, directing pressurized combustion gases to enhance the piston top ring's seal within the cylinder bore, thus reducing blow-by and increasing efficiency. The device also includes features such as valve pocket reliefs, structural lands, and grooves to support piston rings and maintain proper positioning, alongside a strengthened skirt and strut assembly for durability. A self-cleaning combined gas port structure improves resistance to clogging and enhances gas flow dynamics, particularly in high-performance settings. Embodiments further include variations in port configurations and a potential two-ring design, offering versatility while maintaining structural and functional benefits.

12 Claims, 11 Drawing Sheets

PISTON DEVICE WITH COMBINED VERTICAL AND LATERAL GAS PORT

CROSS-REFERENCE TO RELATED APPLICATION

The present application claims priority to, and the benefit of, U.S. Provisional Application No. 63/606,631, which was filed on Dec. 6, 2023, and is incorporated herein by reference in its entirety.

FIELD OF THE INVENTION

The present invention relates generally to the field of engine pistons. More specifically, the present invention relates to an internal combustion engine piston featuring a combined gas port that integrates lateral and vertical port functionalities to enhance sealing, reduce blow-by, and improve efficiency. Accordingly, the present disclosure makes specific reference thereto. Nonetheless, it is to be appreciated that aspects of the present invention are also equally applicable to other like applications, devices, and methods of manufacture.

BACKGROUND

In internal combustion engines, achieving a reliable seal between the piston and cylinder bore is essential for efficient engine performance and optimal fuel combustion. This seal is primarily facilitated by piston rings, which prevent the escape of combustion gases while minimizing oil leakage into the combustion chamber. In particular, the top ring of the piston plays a crucial role in sealing, as it endures the highest combustion pressures. To enhance the effectiveness of this ring, gas ports are often incorporated into the piston design. These gas ports channel combustion pressure to the inner diameter of the top ring, thereby increasing the ring's pressure against the cylinder wall. This additional force helps the ring form a tighter seal, preventing blow-by, which is the unwanted escape of combustion gases past the piston ring. Blow-by not only reduces engine efficiency but can also lead to increased emissions and reduced fuel economy. Therefore, effective sealing mechanisms are necessary to maintain optimal engine function.

However, existing gas port designs face notable limitations. Vertical gas ports, a common type, have the advantage of directly channeling pressure from the combustion chamber to the ring, allowing for efficient sealing. Despite this advantage, vertical gas ports are prone to clogging as a result of carbon buildup, a byproduct of combustion that accumulates over time. Carbon buildup restricts the flow of pressure through the ports, reducing their effectiveness and necessitating periodic cleaning to restore functionality. This frequent maintenance requirement can be costly and inconvenient. In contrast, radial gas ports are less susceptible to clogging, as they have a different orientation that mitigates carbon accumulation to some extent. However, radial gas ports introduce additional manufacturing challenges. Because radial gas ports overlap the top edge of the piston ring groove, their machining process is more complex and often results in burrs along the port edges. These burrs must be meticulously removed through deburring, a labor-intensive process that adds to production costs and complexity. Furthermore, radial gas ports are not as efficient as vertical ports in channeling combustion pressure to the piston ring. Consequently, radial ports do not provide an equivalent level of sealing performance.

Given these issues, current gas port options—vertical and radial—both present significant drawbacks that limit their functionality and increase manufacturing complexity. Vertical gas ports are effective in directing pressure but require frequent maintenance due to clogging, while radial gas ports, although easier to maintain, are complex and costly to manufacture and do not offer the same pressure-routing efficiency. These limitations underscore the need for a new gas port design that combines the advantages of both vertical and radial ports without their respective drawbacks, providing a robust solution that enhances piston ring sealing, reduces maintenance, and simplifies manufacturing.

Therefore, there exists a long-felt need in the art for a piston device with a gas port that resists clogging from carbon buildup. There also exists a long-felt need in the art for a piston device with a gas port that is easier to manufacture without requiring extensive machining or deburring processes. Moreover, there exists a long-felt need in the art for a piston device with a gas port that effectively routes combustion pressure to optimize the sealing function of the piston ring.

The subject matter disclosed and claimed herein, in one embodiment thereof, comprises a piston device with combined vertical and lateral gas port. The device comprises an engine piston with integrated combined gas ports to optimize performance, scaling, and durability. Central to the invention is a singular gas port that merges lateral and vertical gas port functionalities, directing pressurized combustion gases to enhance the piston top ring's seal within the cylinder bore, thus reducing blow-by and increasing efficiency. The device also includes features such as valve pocket reliefs, structural lands, and grooves to support piston rings and maintain proper positioning, alongside a strengthened skirt and strut assembly for durability. A self-cleaning combined gas port structure improves resistance to clogging and enhances gas flow dynamics, particularly in high-performance settings. Embodiments further include variations in port configurations and a potential two-ring design, offering versatility while maintaining structural and functional benefits.

In this manner, the piston device with combined vertical and lateral gas port of the present invention accomplishes all the forgoing objectives and provides a gas port that combines the durability and pressure-routing advantages of vertical ports with the maintenance and manufacturability advantages of radial ports. The improved gas port resists clogging by addressing carbon buildup, reducing the frequency of maintenance required for effective performance. Additionally, the design streamlines the manufacturing process, minimizing the need for deburring and other post-machining processes. This invention thus provides a reliable, efficient solution that enhances the performance and longevity of piston rings in internal combustion engines.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a piston device with combined vertical and lateral gas port. The device is comprised of an engine piston for internal combustion engines, featuring a combined gas port designed to enhance sealing and efficiency. This combined gas port integrates the functionality of lateral and vertical gas ports into a single structure. Strategically positioned, it optimizes the sealing force of the piston top ring against the cylinder bore, reducing blow-by and improving performance in high-compression environments.

The lateral gas port, oriented perpendicularly to the piston's centerline, channels pressurized gases to the inner diameter of the piston top ring, promoting an outward sealing force. The vertical gas port, positioned through the piston crown, directs gases downward onto the top ring, further enhancing the seal. Together, these ports increase ring tension and improve combustion sealing efficiency.

The piston includes key structural features to support its operation. A valve pocket relief provides clearance for exhaust and intake valves, enabling desired compression. A midland and bottomland maintain structural support for the top, middle, and oil ring grooves, ensuring proper ring positioning. A shelf reinforces the piston by supporting the oil ring groove and connecting the skirt panels, which provide a bearing surface for the cylinder wall and retain an oil film. Skirt panels and integrated struts contribute to the piston's strength and deflection resistance.

The device incorporates a pinhole for interfacing with a wrist pin, enabling the conversion of linear piston motion into rotational crankshaft motion. Machined grooves for the top, middle, and oil rings control ring movement and ensure effective sealing.

The combined gas port is machined into the outer diameter of the top land as a notch or opening, aligning lateral and vertical gas ports to form a continuous port. This alignment mitigates clogging, promotes self-cleaning by allowing debris to escape, and enhances gas flow dynamics, ensuring stable ring pressurization. The 90-degree intersection of the port's vertical and radial portions prevents blockage and optimizes performance.

The gas port structure is highly durable, supporting efficient gas flow and ensuring consistent sealing in high-performance applications. The machining design promotes manufacturing reproducibility, and alternative configurations, such as rounded gas port ends, further enhance functionality.

Accordingly, the piston device with combined vertical and lateral gas port of the present invention is particularly advantageous as it provides a gas port that combines the durability and pressure-routing advantages of vertical ports with the maintenance and manufacturability advantages of radial ports. The improved gas port resists clogging by addressing carbon buildup, reducing the frequency of maintenance required for effective performance. Additionally, the design streamlines the manufacturing process, minimizing the need for deburring and other post-machining processes. This invention thus provides a reliable, efficient solution that enhances the performance and longevity of piston rings in internal combustion engines.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
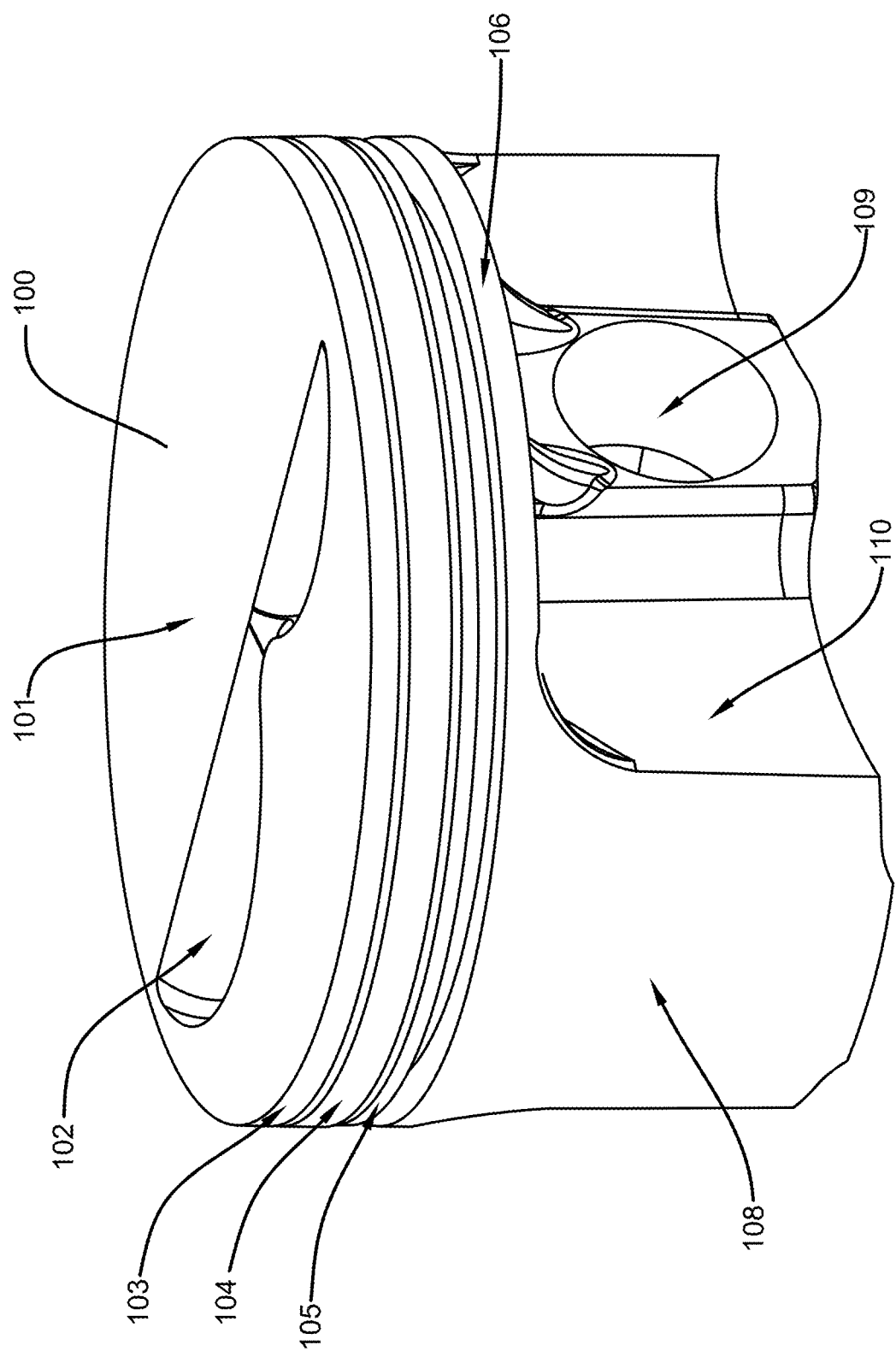
FIG. 1 illustrates a perspective view of a prior art piston with no top ring gas port.
Figure 2:
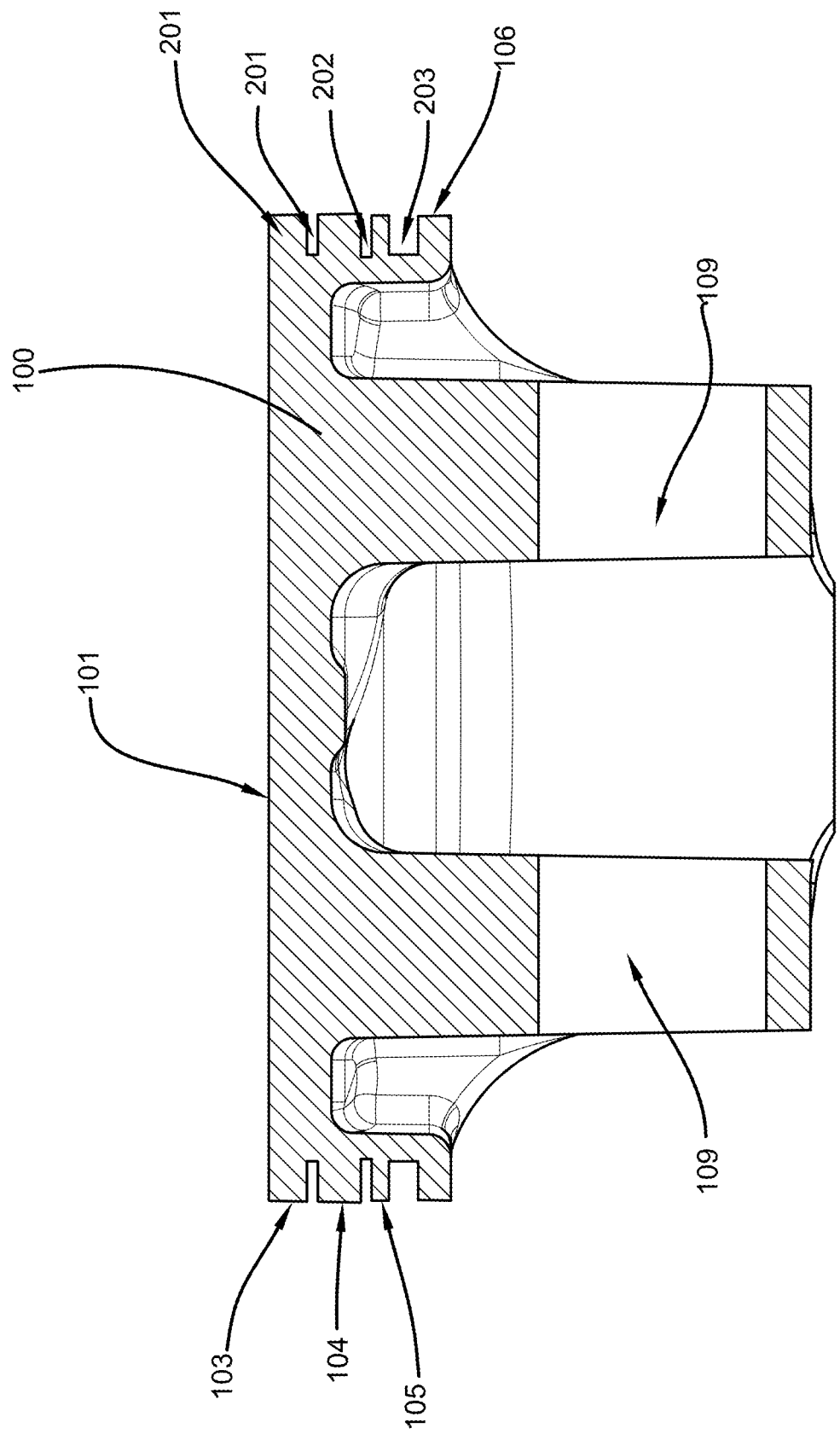
FIG. 2 illustrates a cross-sectional view of the prior art piston disclosed in FIG. 1.
Figure 3:
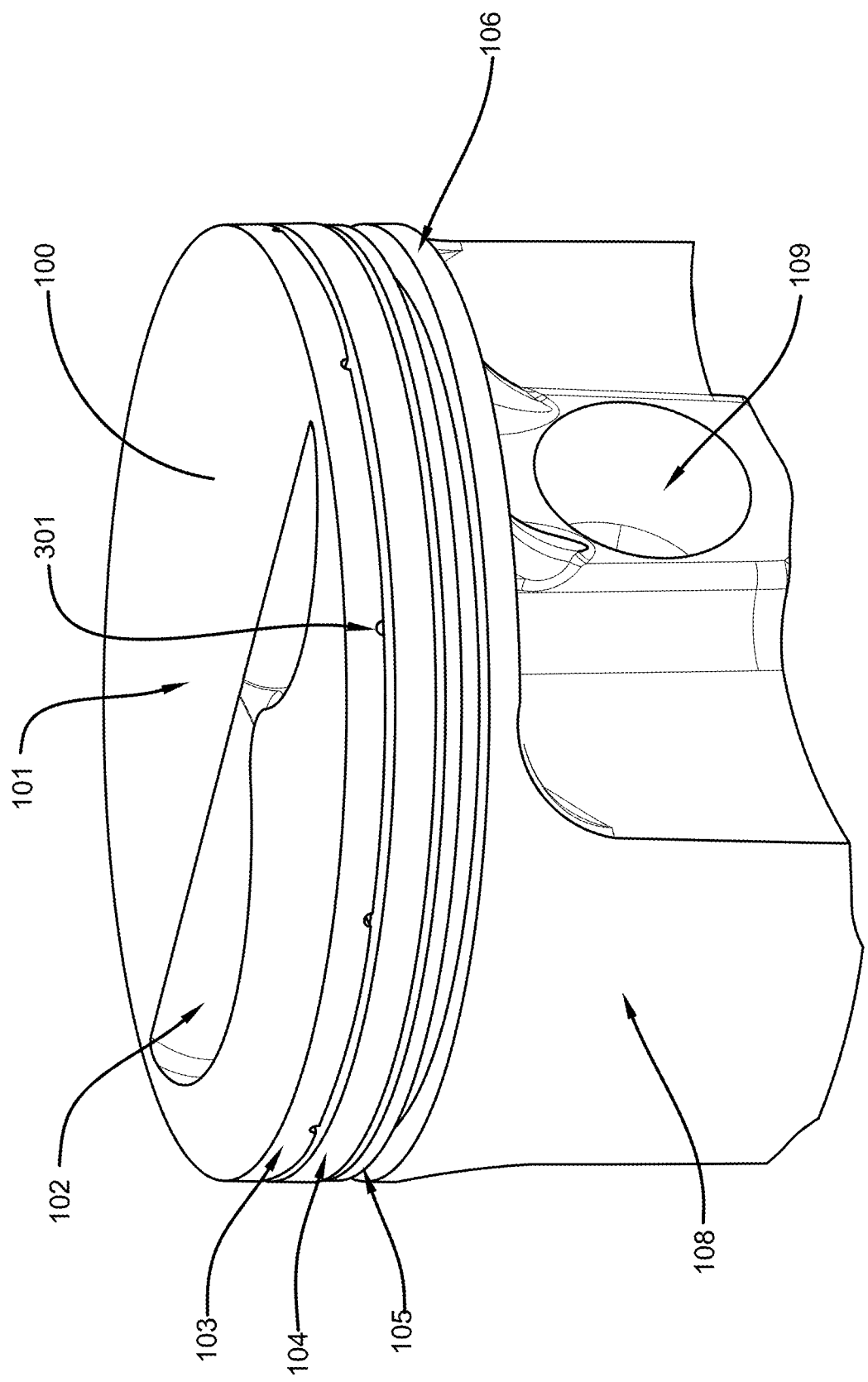
FIG. 3 illustrates a perspective view of a prior art piston comprised of a lateral gas port.
Figure 4:
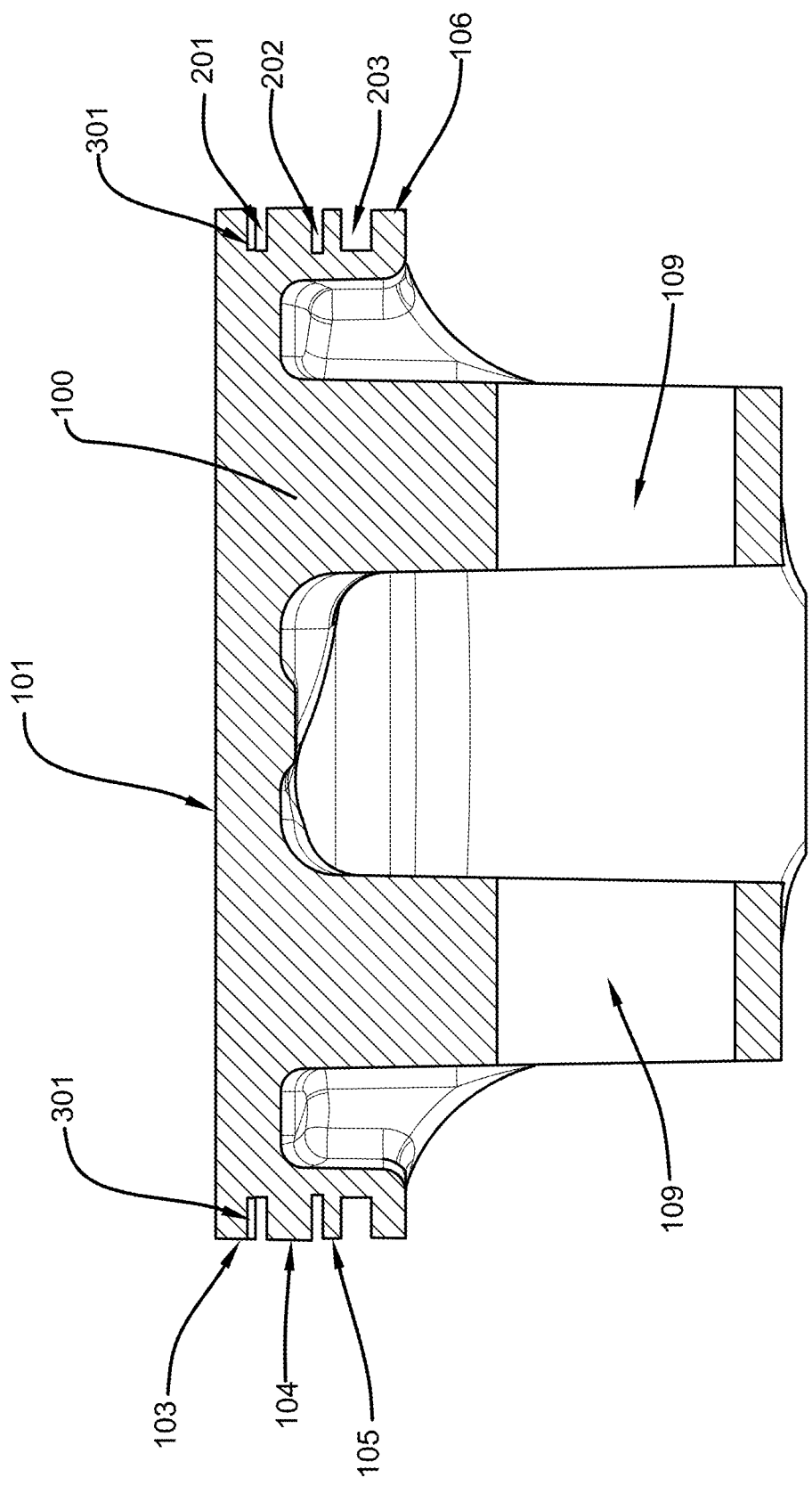
FIG. 4 illustrates a cross-sectional view of a prior art piston comprised of a lateral gas port.
Figure 5:
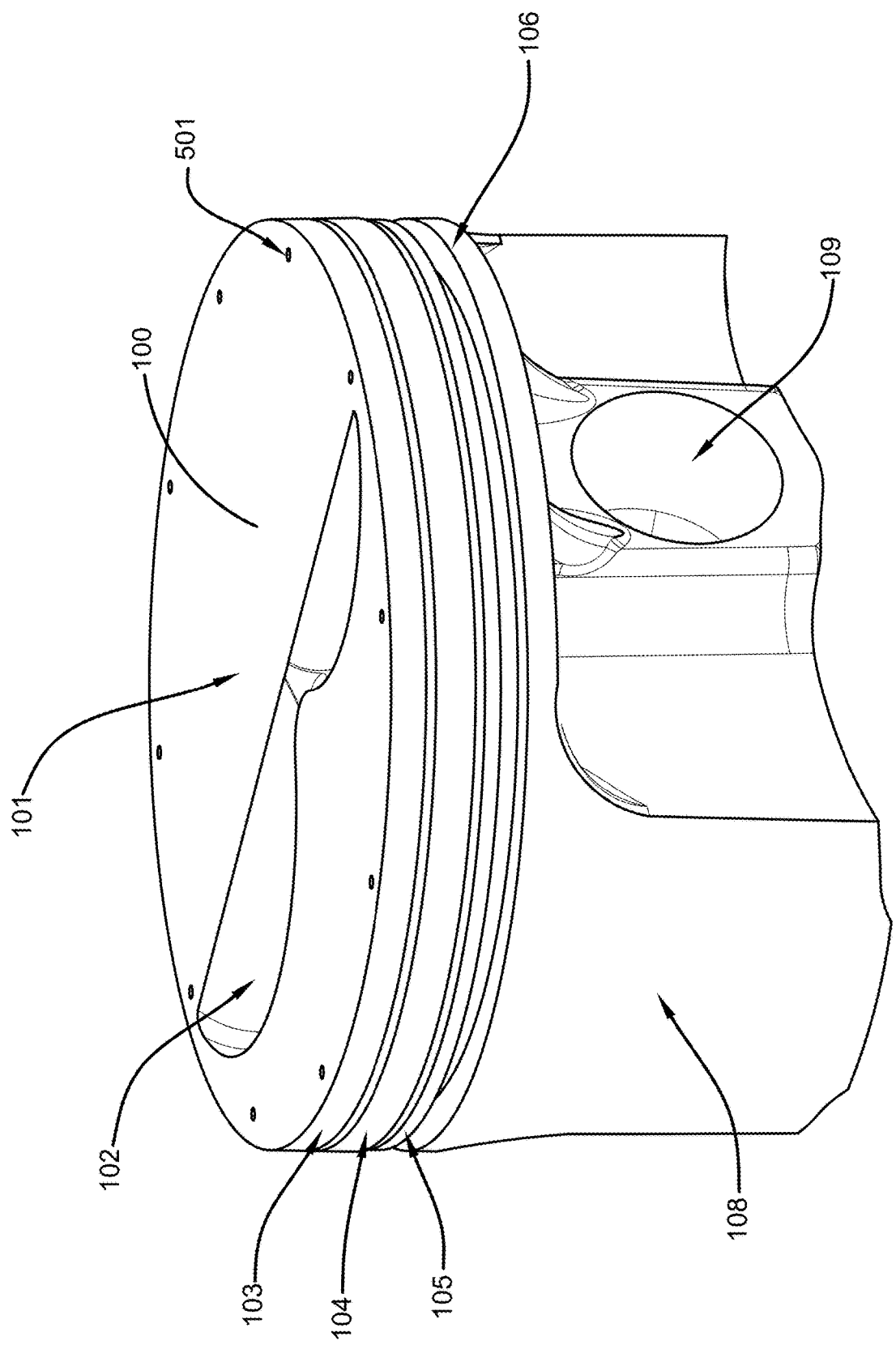
FIG. 5 illustrates a perspective view of a prior art piston comprised of a vertical gas port.
Figure 6:
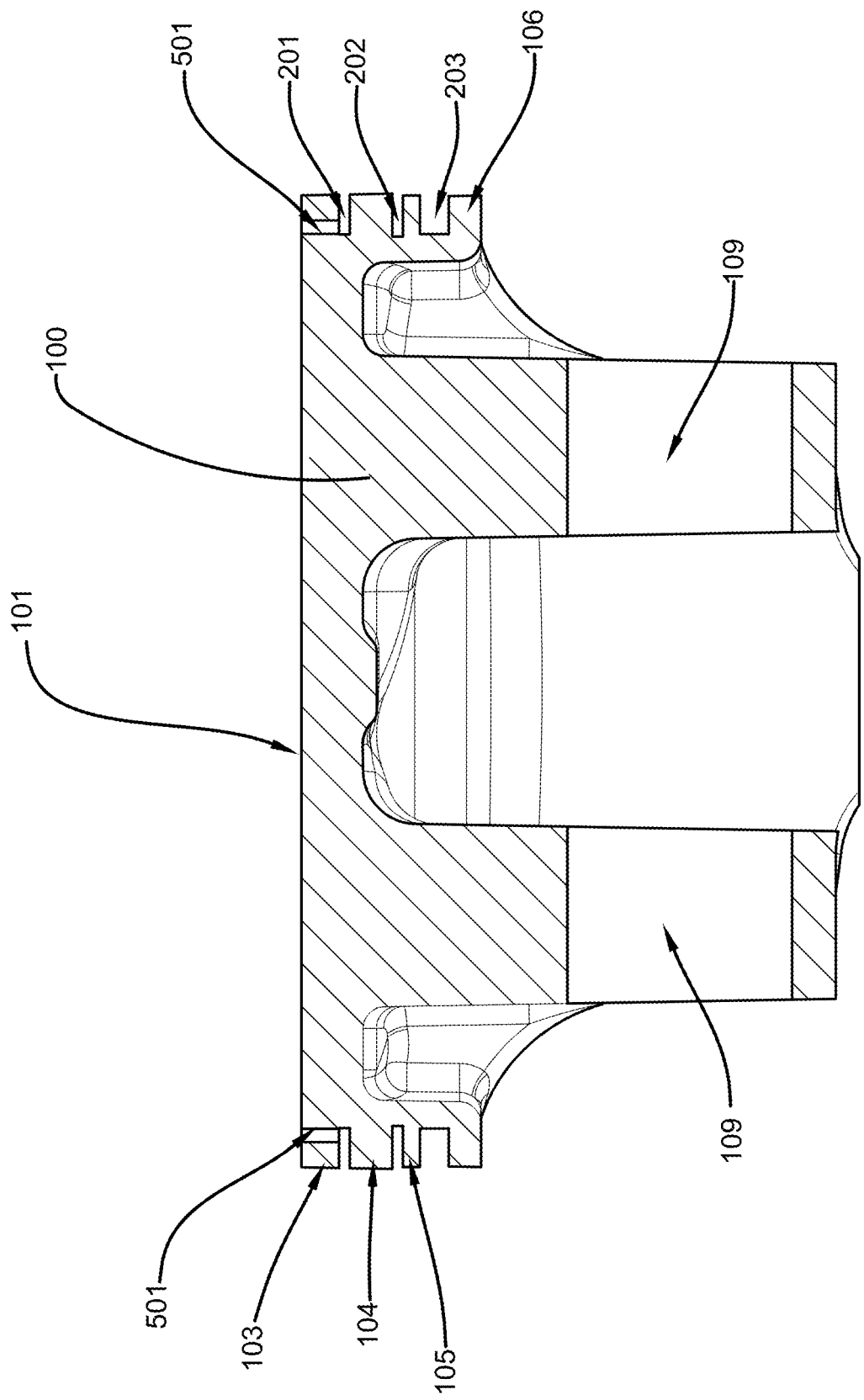
FIG. 6 illustrates a cross-sectional view of a prior art piston comprised of a vertical gas port.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a piston device with a gas port that resists clogging from carbon buildup. There also exists a long-felt need in the art for a piston device with a gas port that is easier to manufacture without requiring extensive machining or deburring processes. Moreover, there exists a long-felt need in the art for a piston device with a gas port that effectively routes combustion pressure to optimize the sealing function of the piston ring.

The present invention, in one exemplary embodiment, is comprised of a piston device with combined vertical and lateral gas port. The device is comprised of an engine piston for internal combustion engines, incorporating a combined gas port designed to improve sealing and efficiency. This combined gas port merges the functionality of lateral and vertical gas ports into a single structure. Positioned strategically, it enhances the sealing force of the piston top ring against the cylinder bore, reducing blow-by and boosting performance in high-compression environments.

The lateral gas port, oriented perpendicularly to the piston's centerline, directs pressurized gases to the inner diameter of the piston top ring, creating an outward sealing force. The vertical gas port, located through the piston crown, channels gases downward onto the top ring, further enhancing the seal. These ports work together to increase ring tension and improve combustion sealing efficiency.

The piston is comprised of structural features that support its operation. A valve pocket relief provides clearance for exhaust and intake valves, enabling the desired compression. A mid land and bottomland provide structural support to the top, middle, and oil ring grooves, ensuring proper ring alignment. A shelf strengthens the piston by supporting the oil ring groove and connecting the skirt panels, which provide a bearing surface for the cylinder wall and retain an oil film. Skirt panels, along with integrated struts, enhance the piston's strength and resistance to deflection.

The device includes a pinhole for interfacing with a wrist pin, enabling the conversion of linear piston motion into rotational crankshaft motion. Machined grooves for the top, middle, and oil rings manage ring movement and ensure effective sealing.

The combined gas port is machined into the outer diameter of the top land as a notch or opening, aligning the lateral and vertical gas ports to form a continuous port. This configuration reduces clogging, facilitates self-cleaning by allowing debris to escape, and improves gas flow dynamics, ensuring stable ring pressurization. The 90-degree intersection of the port's vertical and radial sections prevents blockage and optimizes functionality.

The gas port structure is durable, ensuring efficient gas flow and consistent sealing in high-performance applications. The machining design supports manufacturing reproducibility, with alternative configurations, such as rounded gas port ends, further enhancing functionality.

The piston device with the gas port is particularly advantageous, combining the durability and pressure-routing benefits of vertical ports with the maintenance and manufacturability advantages of radial ports. The design resists clogging caused by carbon buildup, reducing maintenance requirements and streamlining the manufacturing process by minimizing post-machining needs. This invention offers a reliable, efficient solution that improves the performance and durability of piston rings in internal combustion engines.

Referring initially to the drawings, FIGS. 1-6 shows various prior art pistons with lateral and vertical gas ports. FIGS. 7-9A shows various views of the device 100 of the present invention. The device 100 is comprised of an engine piston designed for use in internal combustion engines, incorporating numerous innovative features to optimize performance and reliability. Central to the device's 100 design is at least one combined gas port 701, which integrates the functional attributes of a lateral gas port 301 and a vertical gas port 501 into a singular gas port 701. These gas ports 701 are strategically positioned to enhance the performance of a piston top ring (not shown), ensuring a robust seal within the cylinder bore (not shown), which is critical for reducing blow-by and improving efficiency in high-compression environments.

The lateral gas port 301, oriented laterally and perpendicular to the device's 100 centerline, directs pressurized combustion gases toward the inner diameter of the piston top ring, creating an outward force for a tighter seal with the cylinder wall (not shown). The vertical gas port 501, incorporated through the piston crown 101 and positioned proximal to the inner diameter of the piston top ring (not shown), directs pressurized gases downward onto the piston top ring, further enhancing the outward sealing force. When incorporated together into a singular gas port 701, these ports 301,501 work to increase the load exhibited by the ring on the cylinder, effectively raising its ring tension and improving the combustion gas seal.

To support the device's 100 operation and structural integrity, the device 100 includes several key features. More specifically, the device 100 may be comprised of at least one valve pocket relief 102 that provides clearance for the exhaust and intake valves (not shown), allowing the dome 101 of the device 100 to achieve the desired compression. At least one mid-land 104 serves as a spacer and provides structural support to the top ring groove 201 above it and the middle ring groove 202 below it, controlling the position of the rings in the cylinder. Similarly, the bottom land 105 provides structural support to the middle ring groove 202 and the oil ring groove 203, maintaining the proper positioning of these grooves 202,203. At least one shelf 106 strengthens the device 100 by supporting an oil ring groove 203 and tying together at least one skirt panel 108, which provides a bearing surface for contact with the cylinder wall and retains an oil film for smooth operation. The skirt panels 108, in conjunction with at least one strut 110, contribute to the device's 100 overall strength and resistance to deflection.

Additional features include at least one pinhole 109, which interfaces with a wrist pin (not shown) to enable the connecting rod (not shown) to pivot and convert linear piston motion into rotational crankshaft motion. The top ring groove 201, middle ring groove 202, and oil ring groove 203 are preferably machined slots that interface with the respective piston rings (not shown), controlling their movement and ensuring proper sealing and operation.

Figure 7:
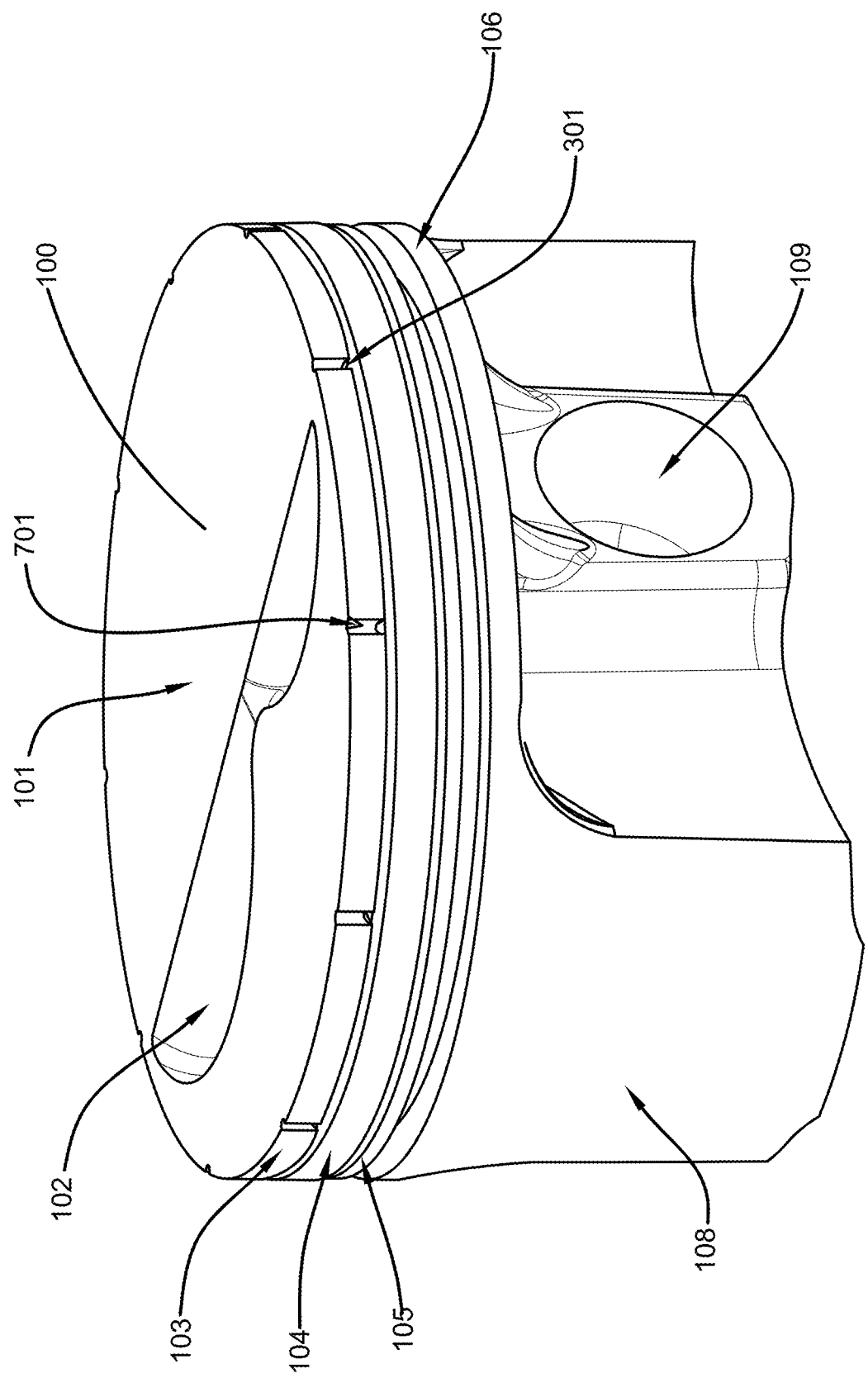
FIG. 7 illustrates a perspective view of a piston of one potential embodiment of a piston device gas port of the present invention comprised of a combined gas port in accordance with the disclosed architecture.
Figure 7A:
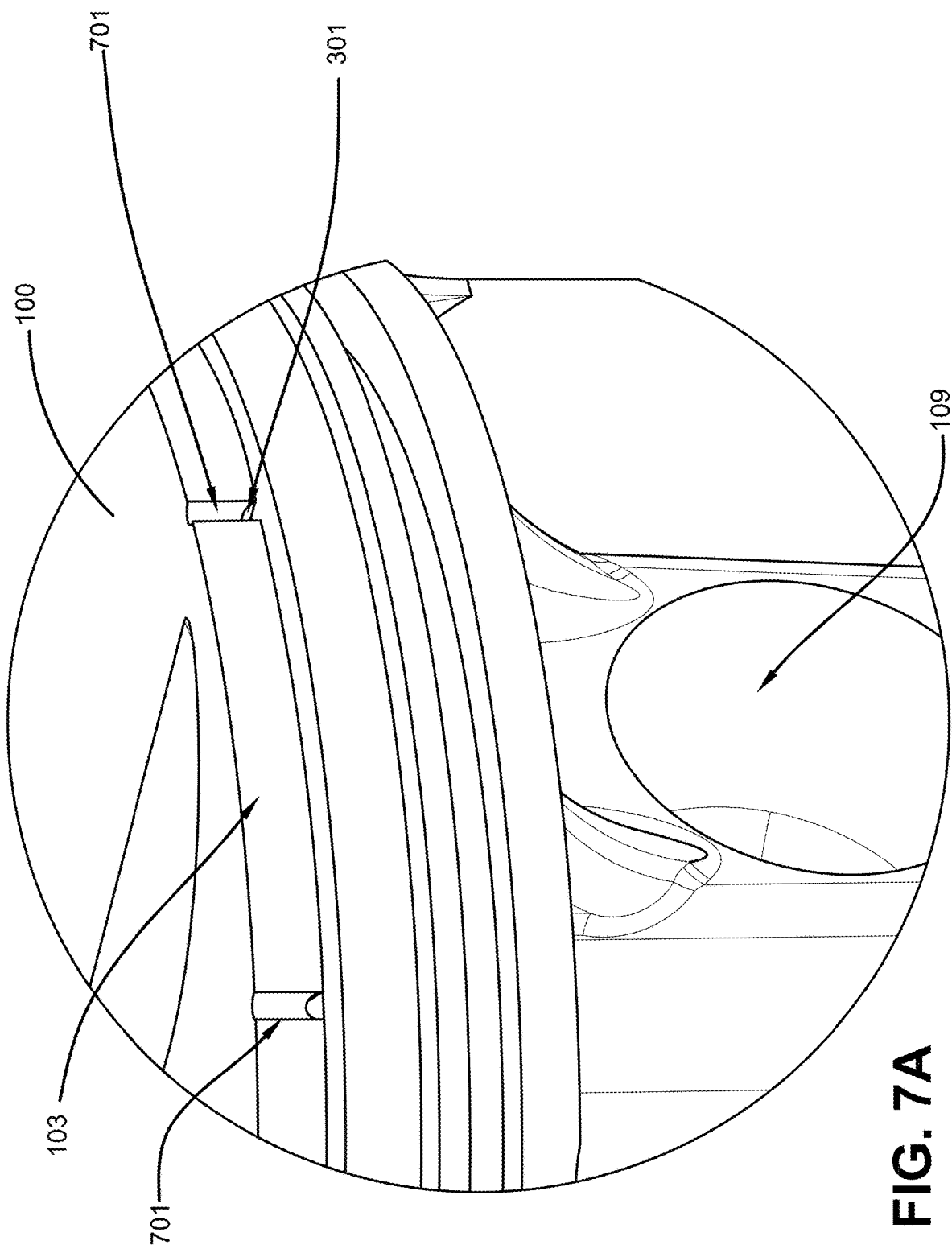
FIG. 7A illustrates an enhanced perspective view of a piston of one potential embodiment of a piston device gas port of the present invention comprised of a combined gas port in accordance with the disclosed architecture.
Figure 8:
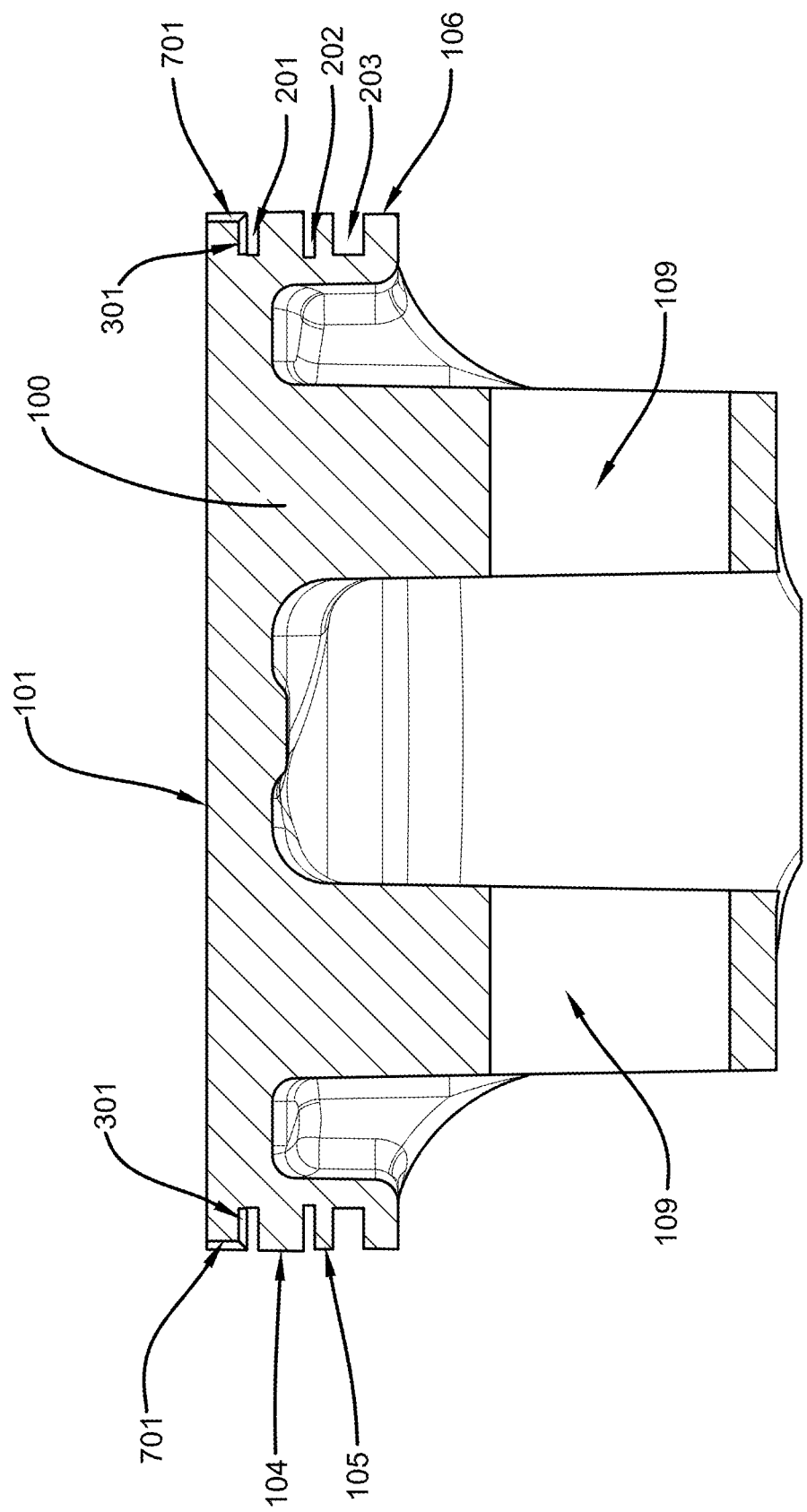
FIG. 8 illustrates a cross-sectional view of a piston of one potential embodiment of a piston device gas port of the present invention comprised of a combined gas port in accordance with the disclosed architecture.

As noted, FIGS. 1 through 6 illustrate various prior art configurations of the gas ports known in the art. FIGS. 7, 7A, and 8, 8A, 9, and 9A depict preferred embodiments of the present invention. In the preferred configuration, the combined gas port 701 is machined into the outer diameter of the top land 103 as a notch and/or opening aligned that is aligned with the lateral gas port 301, as seen in FIG. 7 and FIG. 7A. This alignment forms a continuous gas port 701, merging the functionalities of lateral 301 and vertical 501 gas ports (as seen in FIG. 8) while mitigating clogging caused by combustion byproducts such as carbon deposits. The gas port 701, preferably in the form of a notch and/or opening through the top land 103 sidewall, promotes self-cleaning by providing an escape pathway for debris. The 90-degree intersection with the remainder of the device 100 of the vertical and radial portions of the port 701 enhances gas flow dynamics and prevents blockage, ensuring consistent ring pressurization and stability.

The combined gas port structure 701 offers increased durability, particularly in high-performance applications. Its design supports efficient gas flow and aligns the gas entry with the natural flow path of combustion gases, optimizing the functionality of the top ring (not shown). Furthermore, the orientation and machining of the vertical gas port 501 and lateral gas port 301 ensure high reproducibility in manufacturing processes.

Figure 9:
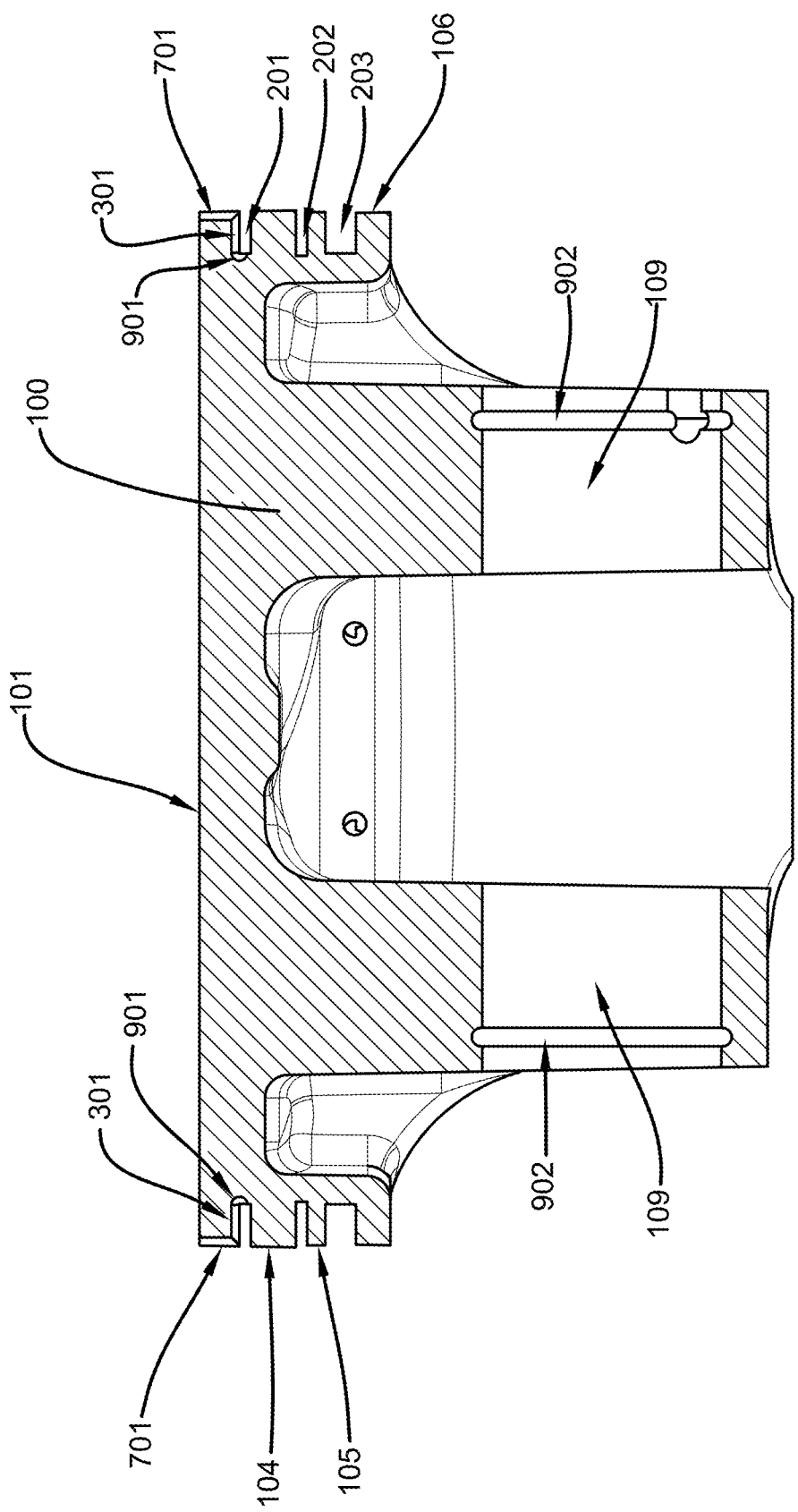
FIG. 9 illustrates a perspective view of a piston of one potential embodiment of a piston device gas port of the present invention comprised of a combined gas port in accordance with the disclosed architecture.
Figure 9A:
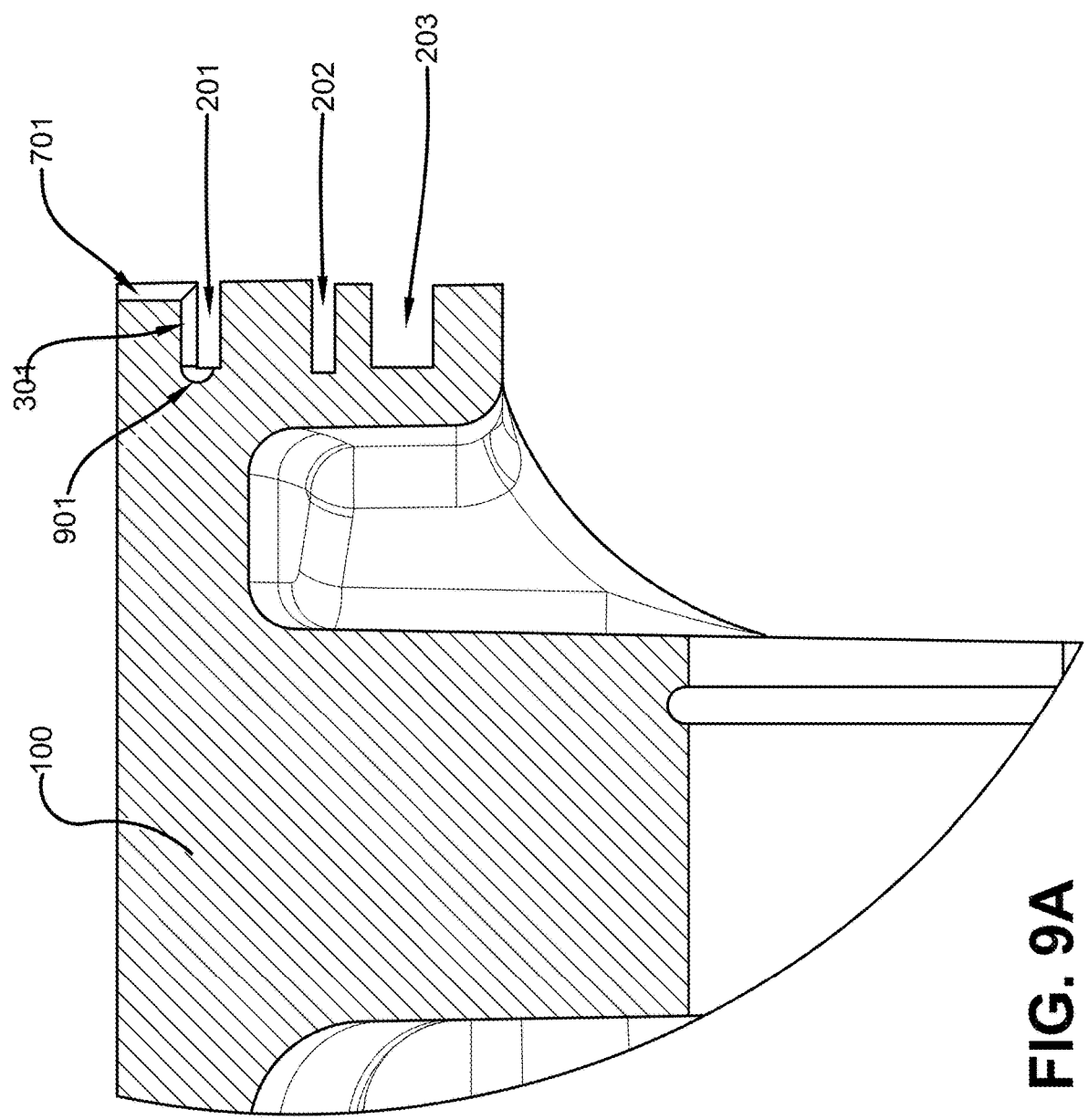
FIG. 9A illustrates an enhanced perspective view of a piston of one potential embodiment of a piston device gas port of the present invention comprised of a combined gas port in accordance with the disclosed architecture.

In one embodiment as seen in FIG. 9. and FIG. 9A, the lateral gas port 301 is comprised of a rounded gas port end 901, produced using a rounded-tip tool that extends beyond tangency with the floor of the ring groove 201. This additional feature offers an alternative approach to enhancing the device's 100 sealing capabilities and performance using alternative tooling, while keeping the functional benefits as described in other embodiments.

In one alternative embodiment the device 100 has a 2-ring configuration, which omits the middle ring, middle ring groove 202, and therefore middle land 104.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "piston device with combined vertical and lateral gas port" and "device" are interchangeable and refer to the piston device with combined vertical and lateral gas port 100 of the present invention.

Notwithstanding the forgoing, the piston device with combined vertical and lateral gas port 100 of the present invention and its various components can be of any suitable size and configuration as is known in the art without affecting the overall concept of the invention, provided that they accomplish the above-stated objectives. One of ordinary skill in the art will appreciate that the size, configuration, and material of the piston device with combined vertical and lateral gas port 100 as shown in the FIGS. are for illustrative purposes only, and that many other sizes and shapes of the piston device with combined vertical and lateral gas port 100 are well within the scope of the present disclosure. Although the dimensions of the piston device with combined vertical and lateral gas port 100 are important design parameters for user convenience, the piston device with combined vertical and lateral gas port 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A piston device with combined vertical and lateral gas port comprising:
   an internal combustion engine piston comprised of:
      a piston crown defining a vertical gas port, the vertical gas port being configured to direct a pressurized gas downward;
      a top land defining a lateral gas port;
      a combined gas port formed as a continuous opening through the top land, the combined gas port formed by the vertical gas port and the lateral gas port; and
   wherein the combined gas port combines the functional attributes of a lateral gas port and a vertical gas port, the combined gas port being positioned to direct a pressurized combustion gas to enhance a sealing performance of a piston top ring;
   wherein the lateral gas port is comprised of a gas port end;
   wherein the gas port end is comprised of a rounded end; and
   further wherein the gas port end extends beyond a tangency with a floor of a top ring groove.

2. The piston device with combined vertical and lateral gas port of claim 1, wherein the combined gas port is machined into the outer diameter of the top land as a notch.

3. The piston device with combined vertical and lateral gas port of claim 1, wherein the lateral gas port is oriented perpendicular to a centerline of the internal combustion engine piston.

4. A piston device with combined vertical and lateral gas port comprising:
   an internal combustion engine piston comprised of:
      a piston crown defining a vertical gas port, the vertical gas port being configured to direct a pressurized gas downward;
      a top land defining a lateral gas port;
      a combined gas port formed as a continuous opening through the top land, the combined gas port formed by the vertical gas port and the lateral gas port;
   wherein the combined gas port combines the functional attributes of a lateral gas port and a vertical gas port, the combined gas port being positioned to direct a pressurized combustion gas to enhance a sealing performance of a piston top ring;
   wherein the combined gas port is self-cleaning;
   wherein the lateral gas port is comprised of a rounded gas port end; and
   further wherein the gas port end extends beyond a tangency with a floor of a top ring groove.

5. The piston device with combined vertical and lateral gas port of claim 4 comprised of a top ring groove, a middle ring groove, and an oil ring groove.

6. The piston device with combined vertical and lateral gas port of claim 4, wherein the combined gas port is machined into the outer diameter of the top land as a notch.

7. The piston device with combined vertical and lateral gas port of claim 4 comprised of a valve pocket relief.

8. A piston device with combined vertical and lateral gas port comprising:
   an internal combustion engine piston comprised of:
      a piston crown defining a vertical gas port, the vertical gas port being configured to direct a pressurized gas downward;

a top land defining a lateral gas port;
a combined gas port formed as a continuous opening through the top land, the combined gas port formed by the vertical gas port and the lateral gas port;
wherein the combined gas port combines the functional attributes of a lateral gas port and a vertical gas port, the combined gas port being positioned to direct a pressurized combustion gas to enhance a sealing performance of a piston top ring;
wherein the combined gas port is self-cleaning;
wherein the lateral gas port being configured to direct a pressurized gas radially outward, and the vertical gas port being configured to direct a pressurized gas axially downward;
wherein the lateral gas port is comprised of a gas port end;
wherein the gas port end is comprised of a rounded end; and
further wherein the rounded gas port end extends beyond a tangency with a floor of a top ring groove.

9. The piston device with combined vertical and lateral gas port of claim 8, wherein the combined gas port is machined to form a continuous opening through the top land, merging the radially outward and the axially downward gas flow paths.

10. The piston device with combined vertical and lateral gas port of claim 8, wherein the combined gas port is machined into the outer diameter of the top land as a notch.

11. The piston device with combined vertical and lateral gas port of claim 8, wherein the lateral gas port is oriented perpendicular to a centerline of the internal combustion engine piston.

12. The piston device with combined vertical and lateral gas port of claim 8 comprised of a pinhole.

* * * * *